United States Patent
Breeze-Stringfellow et al.

(10) Patent No.: US 11,401,824 B2
(45) Date of Patent: Aug. 2, 2022

(54) GAS TURBINE ENGINE OUTLET GUIDE VANE ASSEMBLY

(71) Applicant: General Electric Company, Schenectady, NY (US)

(72) Inventors: Andrew Breeze-Stringfellow, Montgomery, OH (US); Syed Arif Khalid, West Chester, OH (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 17/061,594

(22) Filed: Oct. 2, 2020

(65) Prior Publication Data
US 2021/0222575 A1   Jul. 22, 2021

Related U.S. Application Data

(60) Provisional application No. 62/915,364, filed on Oct. 15, 2019.

(51) Int. Cl.
*F01D 9/04*   (2006.01)
*F01D 17/16*   (2006.01)
(Continued)

(52) U.S. Cl.
CPC ............... *F01D 5/30* (2013.01); *B32B 7/022* (2019.01); *B64C 1/062* (2013.01); *B64C 1/12* (2013.01);
(Continued)

(58) Field of Classification Search
CPC ........ F01D 5/146; F01D 9/041; F01D 17/162; B64C 2201/165; F05D 2220/324; F05D 2220/325; F05D 2240/12
See application file for complete search history.

(56) References Cited

U.S. PATENT DOCUMENTS 2,920,864 A * 1/1960 Johng .................... F01D 5/3007
 416/196 R
3,193,185 A * 7/1965 Erwin ...................... F01D 5/145
 415/193
(Continued)

FOREIGN PATENT DOCUMENTS

FR   3068385 A1 *   1/2019 ............. F01D 9/042

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.
(Continued)

*Primary Examiner* — Topaz L. Elliott
(74) *Attorney, Agent, or Firm* — Dority & Manning, P.A.

(57) ABSTRACT

A single unducted rotor engine includes a power source; a casing surrounding the power source; an unducted rotor assembly driven by the power source having a single row of rotor blades; and an outlet guide vane assembly having a plurality of pairs of outlet guide vanes, each pair of the plurality of pairs of outlet guide vanes including a first outlet guide vane extending from the casing at a location downstream from the single row of rotor blades of the unducted rotor assembly and a second outlet guide vane also positioned downstream from the single row of rotor blades of the unducted rotor assembly. The first outlet guide vane of each pair of outlet guide vanes defines a first geometry. The second outlet guide vane of each pair of outlet guide vanes defines a second geometry. The first geometry is not equal to the second geometry.

12 Claims, 6 Drawing Sheets

(51) Int. Cl.

| | | |
|---|---|---|
| F01D 5/30 | (2006.01) | |
| F02C 7/36 | (2006.01) | |
| F02C 7/32 | (2006.01) | |
| F01D 15/12 | (2006.01) | |
| F01D 15/10 | (2006.01) | |
| F02C 9/00 | (2006.01) | |
| F02C 9/22 | (2006.01) | |
| F02K 1/76 | (2006.01) | |
| F01D 5/12 | (2006.01) | |
| F01D 9/02 | (2006.01) | |
| F01D 5/18 | (2006.01) | |
| F02C 7/264 | (2006.01) | |
| F01D 7/00 | (2006.01) | |
| B64C 1/06 | (2006.01) | |
| B64D 27/12 | (2006.01) | |
| F01D 25/12 | (2006.01) | |
| B32B 7/022 | (2019.01) | |
| B64C 1/12 | (2006.01) | |
| B64D 7/00 | (2006.01) | |
| B64C 1/38 | (2006.01) | |
| F01D 5/14 | (2006.01) | |
| F02K 1/66 | (2006.01) | |
| B64C 1/00 | (2006.01) | |

(52) U.S. Cl.
CPC .................. B64C 1/38 (2013.01); B64D 7/00 (2013.01); B64D 27/12 (2013.01); F01D 5/12 (2013.01); F01D 5/146 (2013.01); F01D 5/187 (2013.01); F01D 5/3007 (2013.01); F01D 7/00 (2013.01); F01D 9/02 (2013.01); F01D 9/041 (2013.01); F01D 15/10 (2013.01); F01D 15/12 (2013.01); F01D 17/162 (2013.01); F01D 25/12 (2013.01); F02C 7/264 (2013.01); F02C 7/32 (2013.01); F02C 7/36 (2013.01); F02C 9/00 (2013.01); F02C 9/22 (2013.01); F02K 1/66 (2013.01); F02K 1/76 (2013.01); B32B 2307/558 (2013.01); B32B 2307/72 (2013.01); B32B 2307/732 (2013.01); B32B 2571/02 (2013.01); B32B 2605/18 (2013.01); B64C 2001/0072 (2013.01); F05D 2220/323 (2013.01); F05D 2230/60 (2013.01); F05D 2240/12 (2013.01); F05D 2240/24 (2013.01); F05D 2240/60 (2013.01); F05D 2250/37 (2013.01); F05D 2260/201 (2013.01); F05D 2260/30 (2013.01); F05D 2260/4031 (2013.01); F05D 2260/70 (2013.01); F05D 2270/05 (2013.01); F05D 2270/051 (2013.01); F05D 2270/121 (2013.01); F05D 2270/304 (2013.01); F05D 2270/71 (2013.01); F05D 2270/81 (2013.01)

(56) References Cited

U.S. PATENT DOCUMENTS

| | | | |
|---|---|---|---|
| 4,534,526 | A | 8/1985 | Metzger et al. |
| 4,917,336 | A | 4/1990 | Jacobs et al. |
| 4,934,825 | A | 6/1990 | Martin |
| 4,976,102 | A | 12/1990 | Taylor |
| 5,148,402 | A | 9/1992 | Magliozzi et al. |
| 5,156,353 | A | 10/1992 | Gliebe et al. |
| 5,190,441 | A | 3/1993 | Murphy et al. |
| 5,197,855 | A | 3/1993 | Magliozzi et al. |
| 5,789,678 | A | 8/1998 | Pla |
| 6,341,747 | B1 | 1/2002 | Schmidt et al. |
| 7,578,132 | B2 | 8/2009 | Webster |
| 8,011,613 | B2 | 9/2011 | Belleville |
| 8,083,482 | B2 | 12/2011 | Serven et al. |
| 8,087,607 | B2 | 1/2012 | Moore et al. |
| 8,186,617 | B2 | 5/2012 | Llamas Sandin |
| 8,196,860 | B2 | 6/2012 | Gall et al. |
| 8,210,798 | B2 | 7/2012 | Stem |
| 8,220,586 | B2 | 7/2012 | Todorovic |
| 8,240,609 | B2 | 8/2012 | Parazzoli et al. |
| 8,350,398 | B2 | 1/2013 | Butt |
| 8,550,397 | B2 | 10/2013 | Verde Preckler et al. |
| 8,672,618 | B2 * | 3/2014 | Guemmer .............. F04D 29/644 415/162 |
| 8,690,106 | B1 | 4/2014 | Reissig |
| 8,967,967 | B2 | 3/2015 | Stretton et al. |
| 9,057,329 | B2 | 6/2015 | Weir et al. |
| 9,102,397 | B2 | 8/2015 | Wood |
| 9,527,578 | B2 | 12/2016 | Towkan |
| 9,540,094 | B2 | 1/2017 | Negulescu et al. |
| 9,725,155 | B2 | 8/2017 | Miller et al. |
| 9,745,051 | B2 | 8/2017 | Tantot et al. |
| 9,758,254 | B2 | 9/2017 | Moore et al. |
| 9,856,745 | B2 | 1/2018 | Ali |
| 9,890,657 | B2 | 2/2018 | Ali |
| 10,060,441 | B2 * | 8/2018 | Macchia ................ F04D 29/542 |
| 10,118,710 | B2 | 11/2018 | Derrez et al. |
| 10,131,441 | B2 | 11/2018 | Edwards et al. |
| 10,202,865 | B2 | 2/2019 | Breeze-Stringfellow et al. |
| 10,370,086 | B2 | 8/2019 | Vion et al. |
| 10,378,452 | B1 | 8/2019 | Barmichev et al. |
| 10,399,664 | B2 | 9/2019 | Bowden et al. |
| 10,414,486 | B2 | 9/2019 | Wood et al. |
| 11,149,552 | B2 * | 10/2021 | Dipietro, Jr ............ F01D 5/141 |
| 2008/0245925 | A1 | 10/2008 | Udall |
| 2010/0124487 | A1 * | 5/2010 | Guemmer ............ F04D 29/563 415/148 |
| 2012/0195739 | A1 | 8/2012 | Kingan |
| 2013/0115083 | A1 | 5/2013 | Vuillemin |
| 2014/0044518 | A1 * | 2/2014 | Wunderer ............... F01D 5/141 415/1 |
| 2014/0245753 | A1 * | 9/2014 | Lamb, Jr. .................. F01D 5/20 60/805 |
| 2014/0248116 | A1 | 9/2014 | Ali |
| 2014/0328675 | A1 * | 11/2014 | Derclaye ............... F04D 29/681 415/194 |
| 2015/0291276 | A1 | 10/2015 | Zatorski et al. |
| 2015/0344127 | A1 | 12/2015 | Wood et al. |
| 2016/0010487 | A1 | 1/2016 | Breeze-Stringfellow et al. |
| 2016/0333729 | A1 | 11/2016 | Miller et al. |
| 2016/0333734 | A1 * | 11/2016 | Bowden .................. F01D 25/24 |
| 2016/0368592 | A1 | 12/2016 | Szymandera |
| 2017/0002688 | A1 | 1/2017 | Beutin et al. |
| 2017/0114796 | A1 * | 4/2017 | Dipietro, Jr .......... F04D 29/544 |
| 2017/0159571 | A1 | 6/2017 | Sidelkovskiy |
| 2017/0225773 | A1 | 8/2017 | Wood et al. |
| 2018/0065727 | A1 | 3/2018 | Gruber et al. |
| 2018/0079492 | A1 | 3/2018 | Seidel et al. |
| 2018/0127084 | A1 | 5/2018 | Tajan et al. |
| 2018/0156124 | A1 * | 6/2018 | Clements ................ F01D 5/146 |
| 2018/0231016 | A1 * | 8/2018 | Power ...................... F02C 9/58 |
| 2018/0334921 | A1 * | 11/2018 | Carugno ................. F01D 9/04 |
| 2018/0335051 | A1 * | 11/2018 | Lurie ..................... F01D 9/041 |
| 2018/0354634 | A1 | 12/2018 | Jodet et al. |
| 2020/0362713 | A1 * | 11/2020 | Bertini .................. F01D 9/041 |
| 2021/0180458 | A1 * | 6/2021 | Dipietro, Jr ............. F01D 5/225 |

OTHER PUBLICATIONS

Gazzaniga et al., Wind Tunnel Performance Results of Swirl Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM.092) Dec. 21, 2015., 96 Pages.

* cited by examiner

GAS TURBINE ENGINE OUTLET GUIDE VANE ASSEMBLY

CROSS-REFERENCE TO RELATED APPLICATIONS

This application is a non-provisional application claiming the benefit of priority under 35 U.S.C. § 119(e) to U.S. Provisional Application No. 62/915,364, filed Oct. 15, 2019, which is hereby incorporated by reference in its entirety.

FIELD

This application is generally directed to a gas turbine engine having an outlet guide vane assembly.

BACKGROUND

A gas turbine engine generally includes a turbomachine and a rotor assembly. In the case of a turbofan engine, the rotor assembly may be configured as a fan assembly. The turbomachine generally includes a high-pressure spool and a low speed spool. A combustion section receives pressurized air, which is mixed with fuel and combusted within a combustion chamber to generate combustion gases. The combustion gases are provided first to a high-pressure turbine of the high-pressure spool, driving the high-pressure spool, and subsequently to a low speed turbine of the low speed spool, driving the low speed spool. The rotor assembly is typically coupled to the low speed spool.

The rotor assembly generally includes a plurality of rotor blades driven by the low speed spool. As will be appreciated, an amount of thrust generated by the gas turbine engine may be increased by providing for a greater thrust loading on the plurality of rotor blades of the rotor assembly during operation of the gas turbine engine. However, the inventors of the present disclosure have found that an increased thrust loading may result in a reduction in efficiency given, e.g., a turbulence in the airflow from the rotor blades, a circumferential component of the airflow from the rotor blades, etc.

Accordingly, a gas turbine engine having one or more features for increasing an efficiency of the gas turbine engine with the increased thrust loading on the rotor assembly would be useful.

BRIEF DESCRIPTION

Aspects and advantages of the invention will be set forth in part in the following description, or may be obvious from the description, or may be learned through practice of the invention.

In an aspect of the present disclosure, a single unducted rotor engine is provided. The single unducted rotor engine defines an axial direction and a radial direction, the engine including: a power source; a casing surrounding the power source; an unducted rotor assembly driven by the power source comprising a single row of rotor blades; and an outlet guide vane assembly comprising a plurality of pairs of outlet guide vanes, each pair of the plurality of pairs of outlet guide vanes including first outlet guide vane extending from the casing at a location downstream from the single row of rotor blades of the unducted rotor assembly and a second outlet guide vane also positioned downstream from the single row of rotor blades of the unducted rotor assembly; wherein the first outlet guide vane of each pair of outlet guide vanes defines a first geometry, wherein the second outlet guide vane of each pair of outlet guide vanes defines a second geometry, and wherein the first geometry is not equal to the second geometry.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As noted in the background, an engine having one or more features for increasing an efficiency of the gas turbine engine with the increased thrust loading on a rotor assembly would be useful. In certain aspects of the present disclosure, such may be accomplished with an engine having a rotor assembly through use of stationary guide vanes having specific geometries to accommodate the thrust loading of the rotor assembly, other features of the engine, noise constraints, etc.

For example, with respect to a single unducted rotor engine defining an axial direction and a radial direction, the engine may include a power source (e.g., a turbomachine, electric motor, etc.), a casing surrounding the power source, an unducted rotor assembly driven by the power source comprising a single row of rotor blades, and an outlet guide vane assembly. The outlet guide vane assembly may include a first outlet guide vane extending from the casing at a location downstream from the single row of rotor blades of the unducted rotor assembly and a second outlet guide vane also positioned downstream from the single row of rotor blades of the unducted rotor assembly. The first outlet guide vane may defines a first geometry, the second outlet guide vane may define a second geometry, and the first geometry may not be equal to the second geometry.

In certain embodiments, the first and second guide vanes may have differing spans, chords, thicknesses, or combinations thereof. The first and second guide vanes may be part of respective pluralities of guide vanes having similar geometries, and the outlet guide vane assembly may include pairs of these first and second guide vanes spaced along a circumferential direction of the engine (e.g., a first plurality of guide vanes having a high span, chord, thickness, or combination thereof alternatingly spaced with a second plurality of guide vanes having a low span, chord, thickness, or combination thereof). Additionally, or alternatively, there may be three or more different geometries within the outlet guide vanes of the outlet guide vane assembly. For example, each of the outlet guide vanes of the outlet guide vane assembly may have different geometries.

Figure 1:
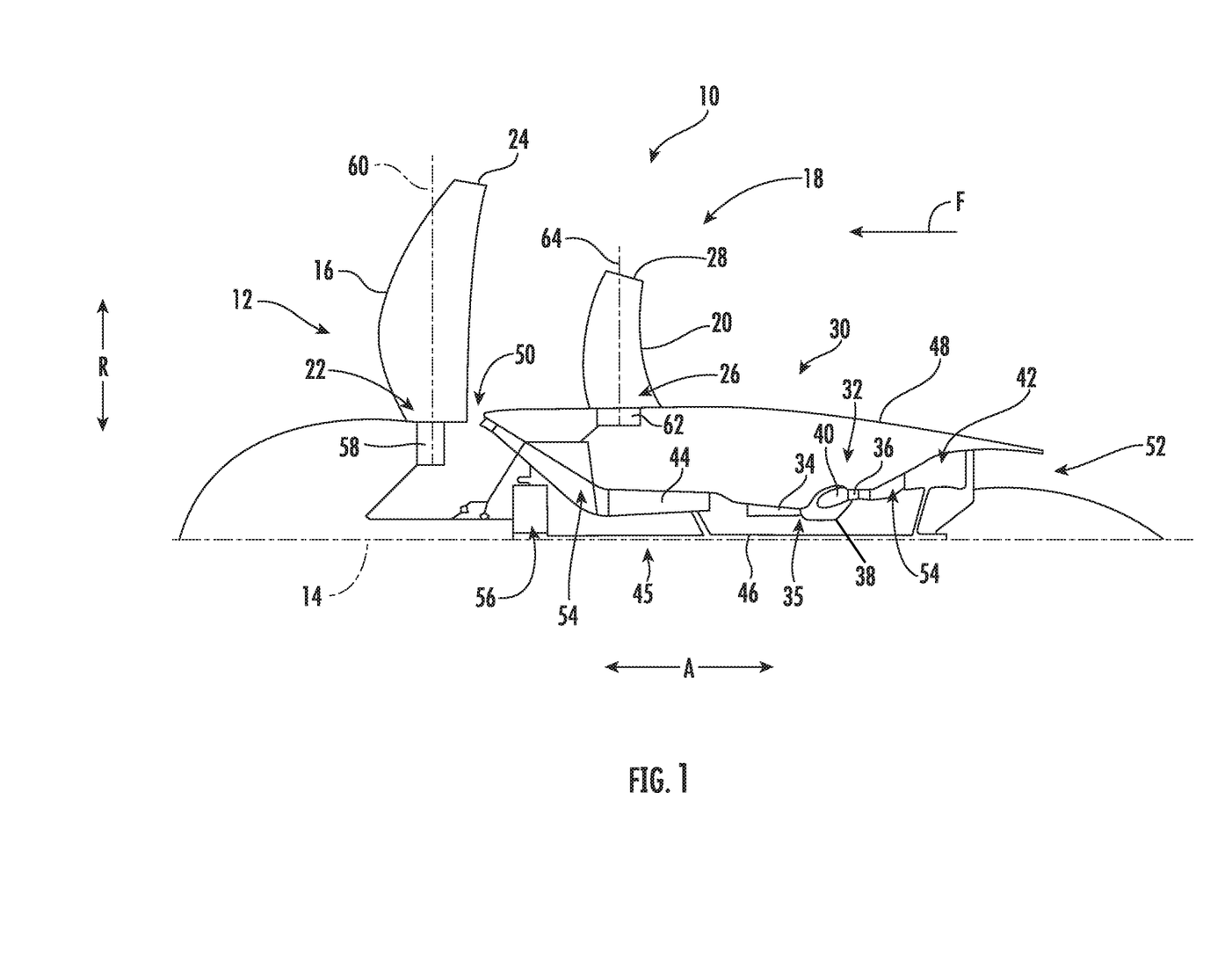
FIG. 1 is a schematic, cross-sectional view of a gas turbine engine in accordance with an exemplary aspect of the present disclosure.

Referring now to the Drawings, FIG. 1 shows an elevational cross-sectional view of an exemplary embodiment of a gas turbine engine as may incorporate one or more inventive aspects of the present disclosure. In particular, the exemplary gas turbine engine of FIG. 1 is a configured as a single unducted rotor engine 10 defining an axial direction A, a radial direction R, and a circumferential direction C (see, e.g., FIG. 2, extending about the axial direction A). As is seen from FIG. 1, the engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14. The rotor blades 16 are arranged in typically equally spaced relation around the centerline 14, and each blade has a root 22 and a tip 24 and a span defined therebetween. Details regarding the vanes 20 will be provided in the discussion below with reference to FIGS. 2, et seq. Generally, however, it will be appreciated that the vanes 20 each have a root 26 and a tip 28 and a span defined therebetween. The rotor assembly 12 further includes a hub located forward of the plurality of rotor blades 16.

Additionally, the engine 10 includes a turbomachine 30 having core (or high speed system) 32 and a low speed system. As used herein, the turbomachine 30 excludes the rotor assembly 12. The core 32 generally includes a high-speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool 35.

The low speed system similarly includes a low speed turbine 42, a low speed compressor or booster 44, and a low speed shaft 46 extending between and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 20 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 20. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency. Further discussion regarding the vane assembly 18 is provided below.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

As is depicted, the rotor assembly 12 is driven by the turbomachine 30, and more specifically, is driven by the low speed spool 45. More specifically, the engine 10 in the embodiment shown in FIG. 1 includes a power gearbox 56, and the rotor assembly 12 is driven by the low speed spool 45 of the turbomachine 30 across the power gearbox 56. The power gearbox 56 may include a gearset for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the axis 14 and generate thrust to propel engine 10, and hence an aircraft to which it is associated, in a forward direction F.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be a ducted turbofan engine, a turboshaft engine, a turboprop engine, turbojet engine, etc.

Moreover, although for the embodiment shown, the single rotor unducted engine 10 is configured as a gas turbine engine having a turbomachine, in other embodiments, the single rotor unducted engine 10 may instead be powered by any other suitable power source, such as an electric machine, a rotary engine, etc.

Figure 2:
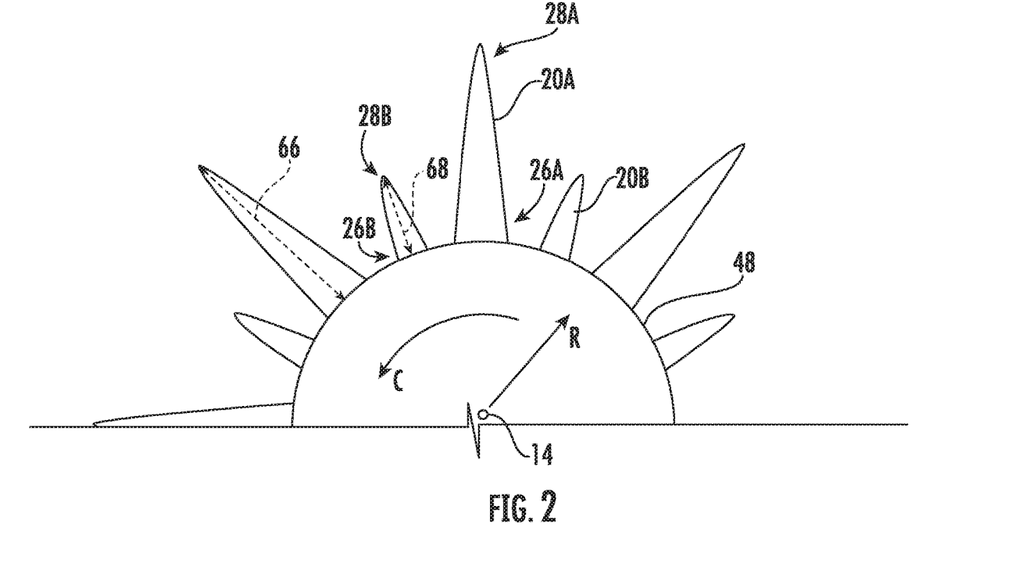
FIG. 2 is a schematic, cross-sectional view of an outlet guide vane assembly of a gas turbine engine in accordance with another exemplary aspect of the present disclosure.

Referring now to FIG. 2, an axial, forward-looking-aft view of a row of outlet guide vanes 20 in accordance with an exemplary embodiment of the present disclosure, as may be incorporated into a gas turbine engine 10, such as the exemplary single unducted rotor engine 10 of FIG. 1, is provided.

For the embodiment of FIG. 2, the plurality of outlet guide vanes 20 are spaced generally along a circumferential direction C of the gas turbine engine 10 (i.e. a direction extending about the centerline axis 14 of the gas turbine engine 10). For the embodiment of FIG. 2, the plurality of outlet guide vanes 20 includes a first plurality of outlet guide vanes and a second plurality of outlet guide vanes. The first and second pluralities of guide vanes are each positioned downstream of the rotor blades 16 of the rotor assembly 12. Moreover, each outlet guide vane of the first plurality of outlet guide vanes defines a first geometry and each outlet guide vane of the second plurality of outlet guide vanes defines the second geometry. For the embodiment shown, the first geometry is not equal to the second geometry.

More particularly, for the embodiment of FIG. 2, the plurality of outlet guide vanes 20 includes a plurality of full-span outlet guide vanes 20A and part-span outlet guide vanes 20B. Each adjacent set of primary outlet guide vane (which for the embodiment shows is a full-span outlet guide vanes 20A) and secondary outlet guide vane (which for the embodiment shown is a part-span outlet guide vane 20B) may be referred to as a pair of outlet guide vanes 20. In such a manner, it will be appreciated that the engine 10 includes a plurality of pairs of outlet guide vanes 20 spaced sequentially along the circumferential direction C.

Specifically, for the embodiment shown, the plurality of full-span outlet guide vanes 20A each define a span 66 extending from a root 26A to a tip 28A. The plurality of part-span outlet guide vanes 20B each define a span 68 extending from a root 26B to a tip 28B. For the embodiment shown, the span 66 of each of the full-span outlet guide vanes 20A is substantially equal to one another and the span 68 of each of the part-span outlet guide vanes 20B is similarly substantially equal to one another.

Moreover, for the embodiment shown the span 68 of the plurality of part-span outlet guide vanes 20B may be equal to between about 5% and about 75% of the span 66 of the plurality of full-span outlet guide vanes 20A. For example, in certain exemplary embodiments, the span 68 of the plurality of part-span outlet guide vanes 20B may be at least about 10%, such as at least about 15%, such as at least about 20%, such as at least about 25%, such as at least about 30%, such as at least about 40%, such as at least about 50% of the span 66 of the plurality of full-span outlet guide vanes 20A. Further, in certain exemplary embodiments, the span 68 of the plurality of part-span outlet guide vanes 20B may be less than about 55%, such as less than about 45%, such as less than about 35%, such as less than about 30%, such as less than about 25%, such as less than about 20% of the span 66 of the plurality of full-span outlet guide vanes 20A.

Notably, for the embodiment of FIG. 2, the base/root 26B of each of the part-span outlet guide vanes 20B is positioned adjacent to the casing 48 of the gas turbine engine 10 (e.g., may be coupled to the casing 48, or may be coupled to a rotatable mount for a pitch change mechanism on or at least partially within the casing 48). In such a manner, each of the plurality of part-span outlet guide vanes 20B is cantilevered from an inner end (e.g., roots 26A, 26B) along the radial direction R from the casing 48 of the gas turbine engine 10.

It will be appreciated that as used herein the term "full-span outlet guide vanes" refers to the largest of the outlet guide vanes in a stage of outlet guide vanes and does not necessarily require the outlet guide vanes to extend to a freestream line around the engine 10.

As discussed elsewhere herein, the plurality of full-span outlet guide vanes 20A may be variable pitch outlet guide vanes 20. In certain exemplary embodiments, the plurality of part-span outlet guide vanes 20B may similarly be variable pitch outlet guide vanes 20.

Further, it will be appreciated, however, that in other exemplary embodiments, the plurality of part-span outlet guide vanes 20B may be configured in any other suitable manner. For example, the plurality of full-span outlet guide vanes 20A may be fixed-pitch outlet guide vanes 20, and/or the plurality of part-span outlet guide vanes 20B may be fixed-pitch outlet guide vanes 20.

Figure 3:
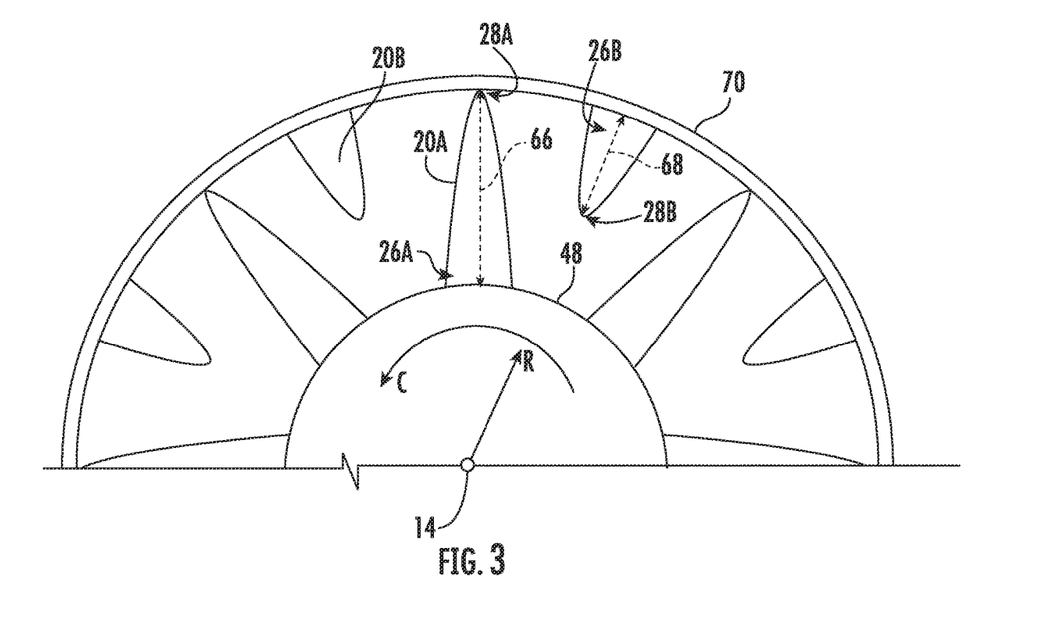
FIG. 3 is another schematic, cross-sectional view of an outlet guide vane assembly of a gas turbine engine in accordance with an exemplary aspect of the present disclosure.

Moreover, referring now to FIG. 3, an axial, forward-looking aft view of a row of outlet guide vanes 20 in accordance with another exemplary embodiment of the present disclosure as may be incorporated into a gas turbine engine 10, such as the exemplary single unducted rotor engine 10 of FIG. 1, is provided.

The exemplary outlet guide vanes 20 of FIG. 3 may be configured in a similar manner as exemplary outlet guide vanes 20 of FIG. 2. However, for the exemplary embodiment of FIG. 3, the plurality of part-span outlet guide vanes 20B are cantilevered from an outer position along the radial direction, and extend inwardly along the radial direction R. More specifically, for the exemplary embodiment of FIG. 3, the gas turbine engine 10 includes an outlet guide vane duct 70 enclosing the plurality of outlet guide vanes 20. The duct 70 extends generally in the circumferential direction C coupling to the outer tips 28B along the radial direction R of the plurality of full-span outlet guide vanes 20A. The plurality of part span outlet guide vanes 20B, are each coupled to the duct 70, and extend inwardly along the radial direction R. The duct 70 may define an axial length about equal to a chord of the plurality of full-span outlet guide vanes 20A. Further, the duct 70 may be local to the outlet guide vanes 20, and may not extend forward to the rotor blades 16 of the engine 10.

For the exemplary embodiment depicted, each of the plurality of part-span outlet guide vanes 20B are spaced substantially evenly between adjacent full-span outlet guide vanes 20A along the circumferential direction C.

It will be appreciated, however, that in other exemplary embodiments, the plurality of part-span outlet guide vanes 20B may instead define an uneven circumferential spacing between adjacent full-span outlet guide vanes 20A. Further, although for the embodiment shown, the plurality of outlet guide vanes 20 includes a single part span outlet guide vane 20B positioned between each pair of adjacent full-span outlet guide vanes 20A, in other exemplary embodiments, the plurality of outlet guide vanes 20 may have any other suitable number of part-span outlet guide vanes 20B between each adjacent pair of full-span outlet guide vanes 20A. For example, in other embodiments, the plurality of outlet guide vanes 20 may include two part-span outlet guide vanes 20B between each pair of full-span outlet guide vanes 20A (spaced evenly, or defining an uneven spacing, along the circumferential direction C), or any other suitable number, such as three, four, five, six, etc.

It will be appreciated that inclusion of part-span outlet guide vanes 20B may allow for increased loading of the plurality of rotor blades 16 of the rotor assembly 20. For example, for the embodiment of FIG. 2, such a configuration may allow for an increased loading of the plurality of rotor blades 16 of the rotor assembly 20 proximate a root 22 of the blades 16/proximate a hub of the gas turbine engine 10 (e.g., at an inner portion along the radial direction R, such as at an inner portion along the radial direction corresponding to the span 68). With such a configuration, inclusion of the plurality of part-span outlet guide vanes 20B extending outward from the casing 48 along the radial direction R of the gas turbine engine 10 provides for accommodation of the increased inward loading of the rotor blades 16, without requiring additional full-length outlet guide vanes 20 (which would result in unnecessary drag and decreased efficiency).

By contrast, for the embodiment of FIG. 3, such a configuration may allow for an increased loading of the plurality of rotor blades 16 of the rotor assembly 20 proximate the tips 24 of the rotor blades 16 of the rotor assembly 20 (e.g., at an outer portion along the radial direction R). Similar to the embodiment of FIG. 2, the embodiment of FIG. 3 provides for accommodation of the increased outward loading of the rotor blades 16 without requiring additional full-length outlet guide vanes 20.

Figure 4:
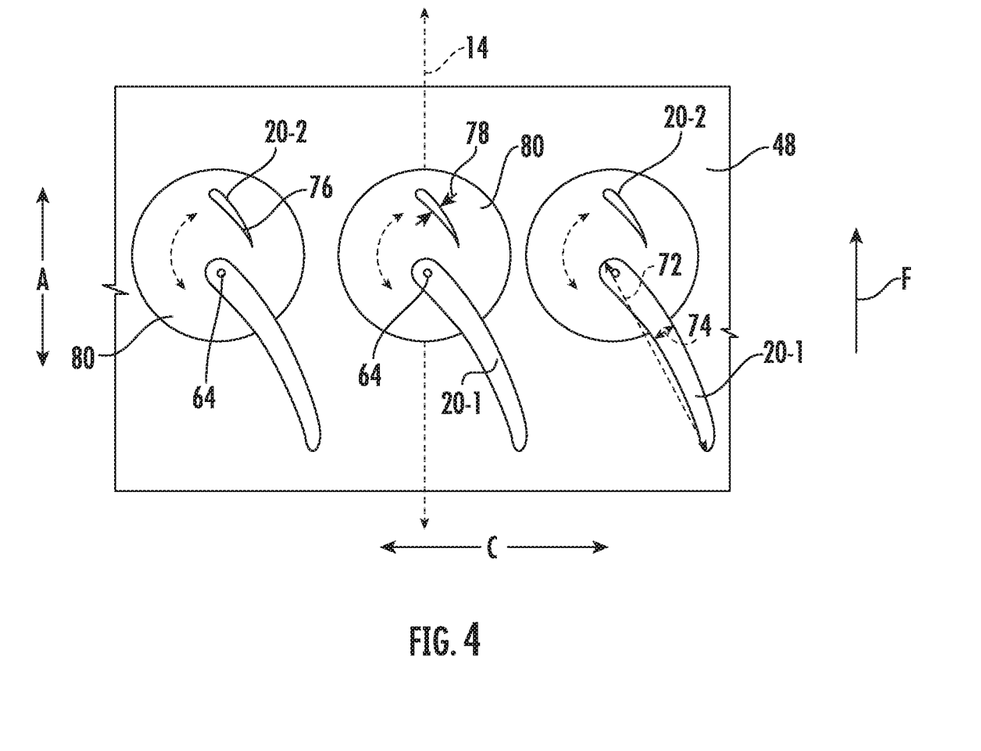
FIG. 4 is a top-down view of a stage of outlet guide vanes in accordance with yet another exemplary embodiment of the present disclosure, as may be incorporated into a gas turbine engine of the present disclosure.

Referring now to FIG. 4, a top-down view is provided of a stage of outlet guide vanes 20 in accordance with yet another exemplary embodiment of the present disclosure, as may be incorporated into a gas turbine engine 10. For the embodiment depicted, the plurality of outlet guide vanes 20 includes a plurality of primary outlet guide vanes 20-1 spaced along a circumferential direction C of the gas turbine engine 10. The plurality of primary outlet guide vanes 20-1 extend between a leading edge and a trailing edge, defining a chord length 72 therebetween. The plurality of primary outlet guide vanes 20-1 further defines a maximum thickness 74.

For the embodiment shown, in addition to the primary outlet guide vanes 20-1, the plurality of outlet guide vanes 20 further includes a plurality of reduced chord outlet guide vanes 20-2 located upstream of the plurality of primary outlet guide vanes 20-1. The reduced chord outlet guide vanes 20-2 each similarly extend between a leading edge and a trailing edge, defining a chord length 76 therebetween, and further defining a maximum thickness 78. Each adjacent set of primary outlet guide vane 20-1 and secondary outlet guide vane (which for the embodiment shown is a reduced chord outlet guide vane 20-2) may be referred to as a pair of outlet guide vanes 20. In such a manner, it will be appreciated that the engine 10 includes a plurality of pairs of outlet guide vanes 20 spaced sequentially along the circumferential direction C.

For the embodiment shown, the chord length 76 of the reduced chord outlet guide vanes 20-2 is less than about 30%, such as less than about 20%, such as less than about 15%, such as less than about 10% of the chord length 72 of the primary outlet guide vanes 20-1. Further, the chord length 76 of the reduced chord outlet guide vanes 20-2 is at least about 2.5%, such as at least about 5%, such as at least about 10% of the chord length 72 of the primary outlet guide vanes 20-1. Further, the maximum thickness 78 of the reduced chord outlet guide vanes 20-2 may also be less than about 30%, such as less than about 20%, such as less than about 15%, such as less than about 10% of the maximum thickness 74 of the primary outlet guide vanes 20-1, and moreover may be at least about 2.5%, such as at least about 5%, such as at least about 10% of the maximum thickness 74 of the primary outlet guide vanes 20-1. In certain embodiments, the chord lengths 72, 76 and maximum thicknesses 74, 78 of the primary outlet guide vanes 20-1 and reduced chord outlet guide vanes 20-2 may be proportional (e.g., the chord lengths 76 and maximum thicknesses 78 of the reduced chord outlet guide vanes 20-2 each being equal to about 10% of the chord lengths 72 and maximum thicknesses 74 of the primary outlet guide vanes 20-1).

Alternatively, however, in other embodiments, the chord lengths 72, 76 and maximum thicknesses 74, 78 of the primary outlet guide vanes 20-1 and reduced chord outlet guide vanes 20-2 may not be proportional.

Notably, the plurality of outlet guide vanes 20 for the embodiment shown are variable pitch outlet guide vanes 20. More specifically, the primary outlet guide vanes 20-1 are mounted to a pitch change mechanism that may include a foundation plate 80 configured to rotate about a respective pitch axis 64 of a respective primary outlet guide vane 20-1. For the embodiment shown, each of the plurality of reduced chord outlet guide vanes 20-2 is also mounted to a foundation plate 80 with a respective primary outlet guide vane 20-1, such that it rotates about the pitch axis 64 of the respective primary outlet guide vane 20 as well.

It will be appreciated, however, that in other exemplary embodiments, the foundation plates 80 are configured to rotate about a pitch axis 64 of a primary outlet guide vane 20-1, in other exemplary embodiments the foundation plate 80 may instead be configured to rotate about an axis located between the primary outlet guide vane 20-1 and reduced chord outlet guide vanes 20-2 mounted thereto. The plurality of pairs of outlet guide vanes (20-1, 20-2) may be configured to change pitch in unison (all change by same amount) or there may be one or more pairs that can be operated independently of the other outlet guide vane pairs, or only some (but not all) of the outlet guide vane pairs may be configured to have a variable pitch capability. For instance, in the case that some of the outlet guide vanes (20-1, 20-2) are mounted on, or incorporated into, a nearby structure (e.g., a pylon), such outlet guide vanes (20-1, 20-2) may not be configured as variable pitch outlet guide vanes.

For the embodiment shown, it will be appreciated that the leading edge of each primary outlet guide vane 20-1 is substantially aligned with the leading edge of a respective reduced chord outlet guide vane 20-2 along the circumferential direction C during at least certain pitch positions, such as the one shown, as may be used during cruise or takeoff. More specifically, for the embodiment shown, the leading edge of each primary outlet guide vane 20-1 is substantially aligned with the leading edge of a respective reduced chord outlet guide vane 20-2 along the circumferential direction C of the gas turbine engine 10, such that each defines substantially the same position along the circumferential direction C and different axial positions along the centerline axis 14.

Figure 5:
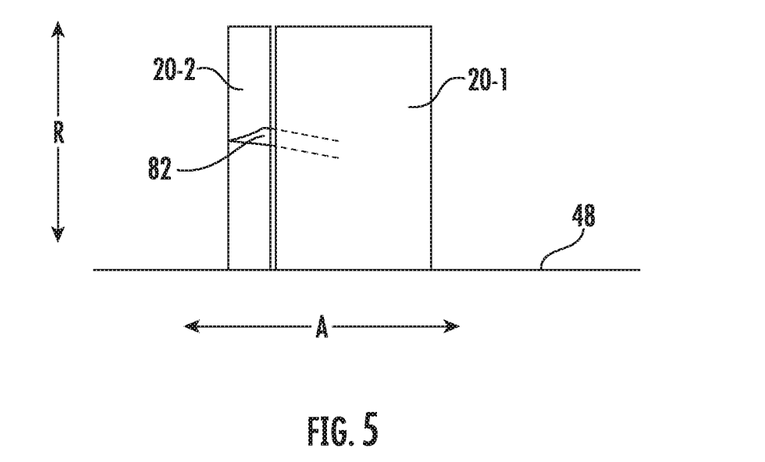
FIG. 5 is a perspective view of the exemplary outlet guide vanes of FIG. 4.

Referring briefly to FIG. 5, it will be appreciated that in at least certain exemplary embodiments, the plurality of outlet guide vanes 20 may further include a brace 82 extending between one of the primary outlet guide vanes 20-1 and a respective reduced chord outlet guide vane 20-2. The brace 82 extends between the two guide vanes at a part span location, such as at a mid-span location. Such a configuration may allow for a proportionally reduced maximum thickness 78 in the reduced chord outlet vane 20-2.

It will be appreciated, however, that in other embodiments, the reduced chord outlet guide vane 20-2 may additionally, or alternatively, define an increased relative thickness, a reduced span (see, e.g., FIG. 2), or any other suitable configuration to structurally accommodate the reduced chord configuration.

It will be appreciated, that despite the inclusion of the brace 82, the pair of primary outlet guide vane 20-1 and respective reduced chord outlet guide vane 20-2 connected by such brace 82 may not be otherwise connected to an adjacent primary outlet guide vane 20-1 and/or reduced chord outlet guide vane 20-2 (except by virtue of them all be connected at the casing 48).

Inclusion of reduced chord outlet guide vanes 20-2 in accordance with such an exemplary embodiment may allow for the gas turbine engine 10 to increase a loading on the plurality of rotor blades 16 of the rotor assembly 20. More specifically, such a configuration may allow for the plurality of outlet guide vanes 20 to accommodate a higher incidence angle of an airflow from the rotor assembly 20. More specifically, inclusion of the plurality of reduced chord outlet guide vanes 20-2 may prevent or minimize a separation of an airflow from the rotor assembly 20 over the primary outlet guide vanes 20-1 when the airflow from the rotor blades 16 is provided at a relatively high angle of incidence, keeping such flow attached or substantially attached to the primary outlet guide vanes 20-1.

It will be appreciated, however, that in other exemplary embodiments, the stage of outlet guide vanes 20 may have still other suitable configurations. For example, reference will now be made to FIGS. 6 and 7, each providing a top-down view of a stage of outlet guide vanes 20 in accordance with two additional exemplary embodiments of the present disclosure, each as may be incorporated into a gas turbine engine 10. Each of the embodiments of FIGS. 6 and 7 may be configured in substantially the same manner as the exemplary embodiment of FIG. 4. Accordingly, the plurality of outlet guide vanes 20 depicted in these Figs. each includes a plurality of primary outlet guide vanes 20-1 spaced along a circumferential direction C of the gas turbine engine 10 and a plurality of reduced chord outlet guide vanes 20-2 similarly spaced along the circumferential direction C of the gas turbine engine 10.

Figure 6:
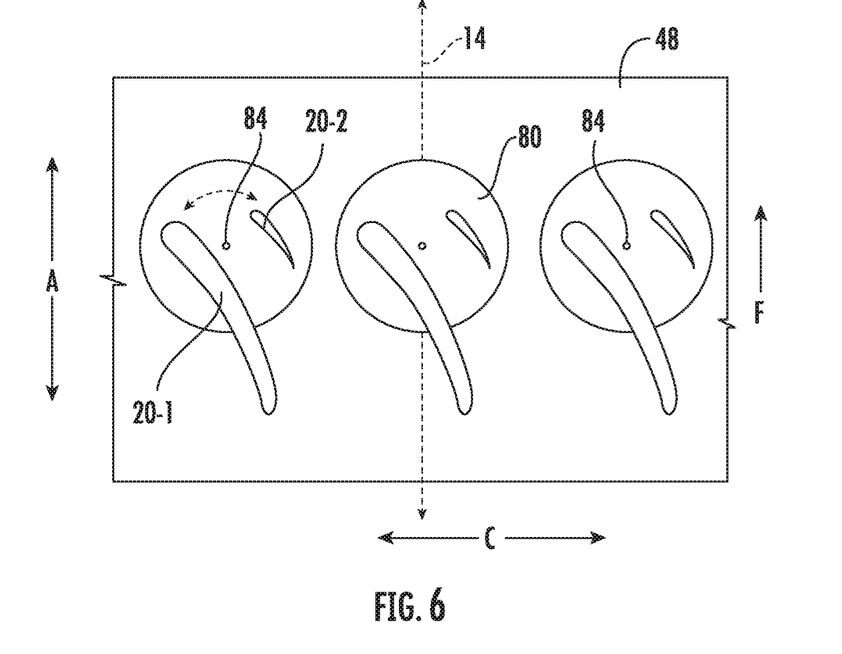
FIG. 6 is a top-down view of a stage of outlet guide vanes in accordance with still another exemplary embodiment of the present disclosure, as may be incorporated into a gas turbine engine of the present disclosure.

Referring first particularly to FIG. 6, a leading edge of each primary outlet guide vane 20-1 is offset from a leading edge of a respective reduced chord outlet guide vane 20-2 along the circumferential direction C during at least certain pitch positions, such as the one shown, as may be used during cruise or takeoff. More specifically, for the embodiment shown, the leading edge of each primary outlet guide vane 20-1 is aligned with the leading edge of a respective reduced chord outlet guide vane 20-2 along the centerline axis 14 of the gas turbine engine 10, such that each defines substantially the same axial position along the centerline axis 14 and such that each defines offset circumferential positions along the circumferential direction C.

Notably, as with the embodiment of FIG. 4, each of the pair of primary outlet guide vane 20-1 and respective reduced chord outlet guide vane 20-2 is coupled to a common foundation plate 80, such that the primary outlet guide vane 20-1 and respective reduced chord outlet guide vane 20-2 each rotates together. However, for the embodiment shown, an axis of rotation 84 of the common foundation plate 80 is positioned outside of the primary outlet guide vane 20-1, between the pair of primary outlet guide vane 20-1 and respective reduced chord outlet guide vane 20-2.

Figure 7:
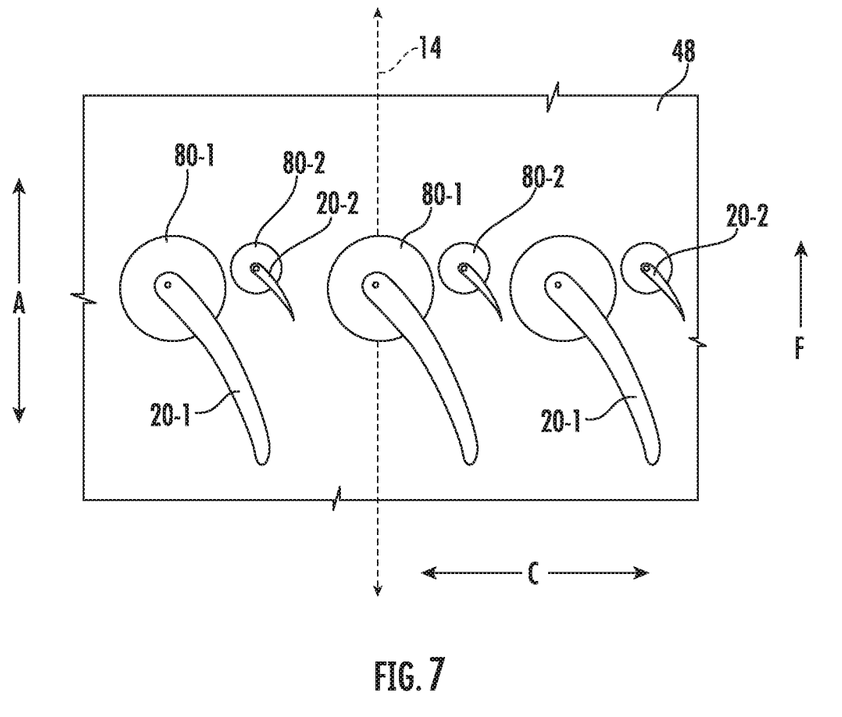
FIG. 7 is a top-down view of a stage of outlet guide vanes in accordance with yet another exemplary embodiment of the present disclosure, as may be incorporated into a gas turbine engine of the present disclosure.

Referring now specifically to FIG. 7, the plurality of primary outlet guide vanes 20-1 and reduced chord outlet guide vanes 20-2 are again configured as variable pitch outlet guide vanes. However, for the embodiment of FIG. 7, the engine 10 includes primary foundation plates 80-1 and reduced chord foundation plates 80-2. Each of the primary outlet guide vane 20-1 is coupled to a respective primary foundation plate 80-1 and each of the reduced chord outlet guide vanes 20-2 is coupled to a respective reduced chord foundation plate 80-2. In such a manner, the primary outlet guide vane 20-1 and respective reduced chord outlet guide vane 20-2 each rotates about a respective primary pitch axis 64-1 of the respective primary outlet guide vane 20-1 and about a respective reduced chord pitch axis 64-2 of the respective reduced chord outlet guide vane 20-2. Such a configuration may allow for the reduced chord outlet guide vanes 20-2 to be moved relative to the primary outlet guide vanes 20-1 during operation to facilitate a more efficient engine and higher thrust loading on the rotor assembly 12.

It will further be appreciated that in at least certain exemplary embodiments the single unducted rotor engine 10 produces thrust more efficiently by efficiently converting an amount of kinetic energy within an exhaust stream of the rotor assembly into thrust. A potential source of inefficiency in such a conversion is in tip vortices from the plurality of static vanes positioned downstream of the rotor assembly, i.e., the outlet guide vanes 20. The inefficiencies of such tip vortices may come from both a loss generated at a tip of the outlet guide vanes 20 and the loss increases as a low momentum fluid within these tip vortices travel downstream. Certain exemplary aspects of the present disclosure may combat the effect of the latter.

Figure 8:
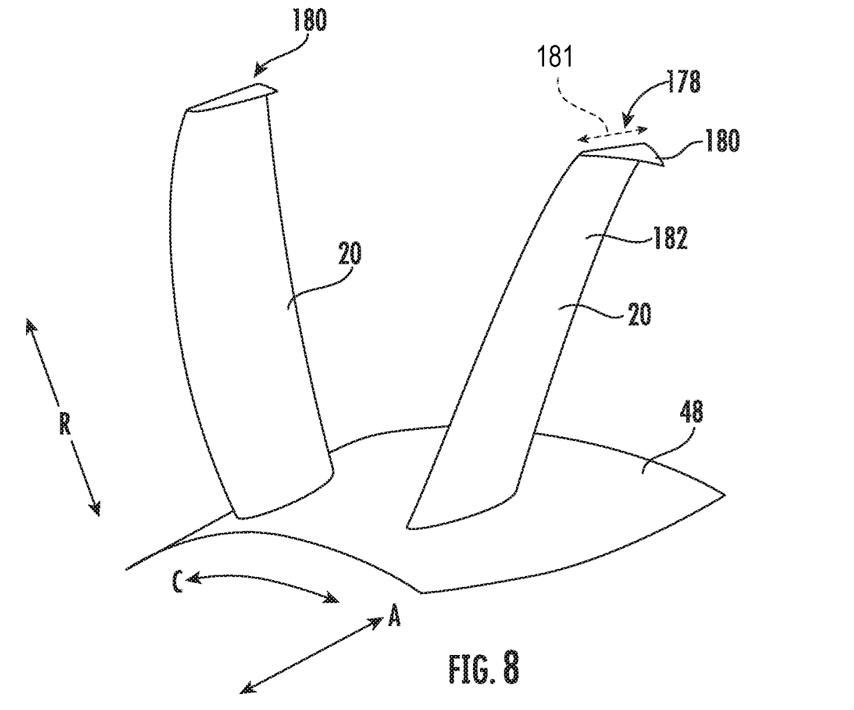
FIG. 8 is a partial, perspective view is provided of a plurality of outlet guide vanes in accordance with yet another exemplary embodiment of the present disclosure.

More specifically, referring now to FIG. 8, a partial, perspective view is provided of a plurality of outlet guide vanes 20 in accordance with yet another exemplary embodiment of the present disclosure, as may be incorporated into a single unducted rotor engine 10. In the exemplary embodiment depicted, the plurality of outlet guide vanes 20 are spaced generally along a circumferential direction C of the single unducted rotor engine 10 and extends between a root coupled to a casing 48 of the single unducted rotor engine 10 and a tip 178, generally along a radial direction R of the single unducted rotor engine 10. Further, the exemplary outlet guide vanes 20 depicted define a span 160 between the root and the tip 178 and a tip chord length 181 at the tip 178.

For the embodiment shown, each of the plurality of outlet guide vanes 20 further includes a winglet 180 positioned at the tip 178 of the respective outlet guide vane 20. The winglet 180 may distribute the tip loss circumferentially before it travels far downstream. By making the low momentum fluid near the tip 178 of the vane less concentrated, an overall loss is reduced and the net thrust is increased.

Figure 9:
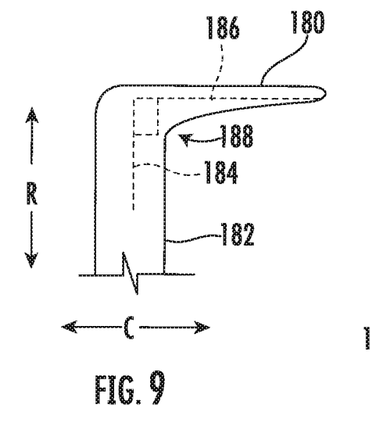
FIG. 9 is a close-up, forward-looking-aft view of a winglet of a first outlet guide vane of the plurality of outlet guide vanes in FIG. 8 in accordance with another exemplary embodiment of the present disclosure.

Referring now briefly to FIG. 9, a close-up, forward-looking-aft view of a winglet 180 of a first outlet guide vane 20 of the plurality of outlet guide vanes 20 in FIG. 8 is depicted. For the embodiment shown, it will be appreciated that the winglet 180 extends substantially abruptly from a base 182 of the outlet guide vane 20. For example, the exemplary winglet 180 depicted extends substantially 90 degrees from the base 182 of the outlet guide vane 20, as measured by a centerline 184 of the base 182 of the outlet guide vane 20 and a centerline 186 of the winglet 180 of the outlet guide vane 20. For example, in certain exemplary embodiments, the winglet 180 may define an angle with the base 182 of the outlet guide vane 20 between about 75° and about 105°.

Further, the exemplary winglet 180 defines a bend 188 with the base 182 of the outlet guide vane 20, the bend 188 defining a radius of curvature. The radius of curvature of the bend 188 may be less than about 4% of the tip chord length 181 of the respective outlet guide vane 20, such as less than about 3% of the tip chord length 181, such as less than about 2% of the tip chord length 181, such as less than about 1% of the tip chord length 181, and at least about 0.005% of the tip chord length 181.

Figure 10:
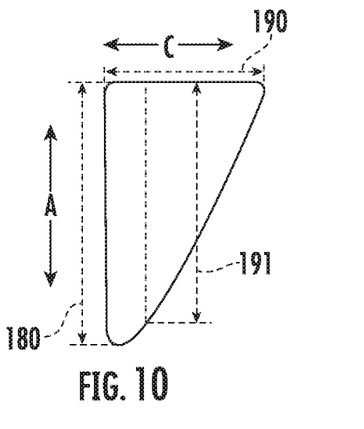
FIG. 10 is a top-looking-down view of the winglet of the first of the outlet guide vanes of FIG. 8.

Moreover, referring also to FIG. 10, providing a top-looking-down view of the winglet 180 of the first of the outlet guide vanes 20 of FIG. 8, it will further be appreciated that the winglet 180 defines a width 190 along the circumferential direction C. The width 190 of the winglet 180 may be relatively small, such as less than about 20% of the tip chord length 181, such as less than about 10% of the tip chord length 181, such as less than about 5% of the tip chord length 181, and greater than about 1% of the tip chord length 181.

However, in other embodiments, the width 190 of the winglet 180 may be relatively large, such as less than about 150% of the tip chord length 181, such as less than about 125% of the tip chord length 181, such as less than about 100% of the tip chord length 181, and greater than about 20% of the tip chord length 181, such as greater than about 50% of the tip chord length 181.

Figure 11:
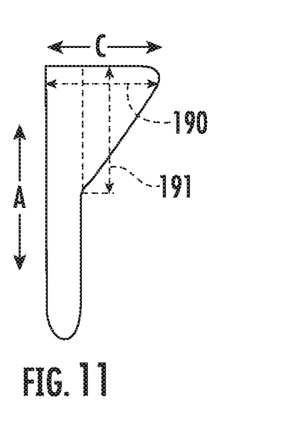
FIG. 11 is a top looking down view of a winglet of an outlet guide vane in accordance with another exemplary embodiment of the present disclosure.

Further, for the embodiment shown, the winglet 180 depicted extends substantially along the tip chord length 181 of the respective outlet guide vane 20, defining a winglet chord 191 substantially equal to the tip chord length 181. It will be appreciated, however, that in other exemplary embodiments, the winglet chord 191 may be smaller than the tip chord length 181 of the respective outlet guide vane 20. For example, referring now to FIG. 11, providing a top looking down view of a winglet 180 of an outlet guide vane 20 in accordance with another exemplary embodiment of the present disclosure, the exemplary winglet 180 defines a winglet chord 191 less than about 75% of the tip chord length 181 of the respective outlet guide vane 20, such as less than about 60% of the tip chord length 181 of the respective outlet guide vane 20, such as less than about 50% of the tip chord length 181 of the respective outlet guide vane 20, and at least about 5% of the tip chord length 181 of the respective outlet guide vane 20.

Figure 12:
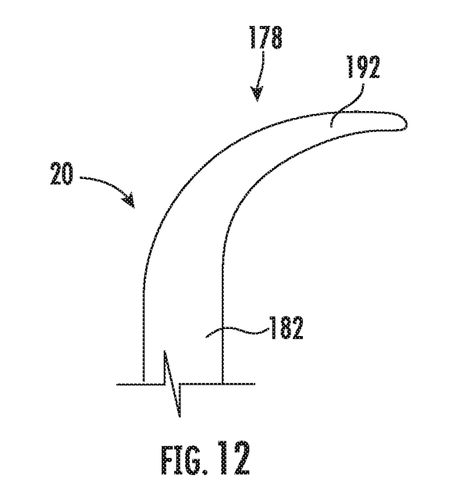
FIG. 12 is a close-up, forward-looking-aft view of a winglet of a first outlet guide vane of a plurality of outlet guide vanes in accordance with another exemplary embodiment of the present disclosure.
Figure 13:
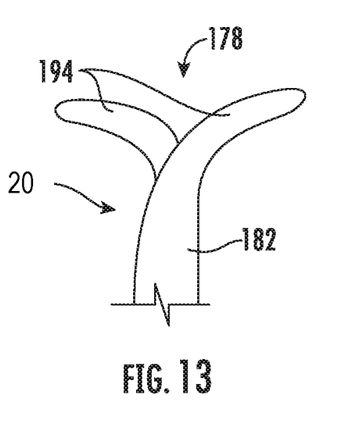
FIG. 13 is a close-up, forward-looking-aft view of a winglet of a first outlet guide vane of a plurality of outlet guide vanes in accordance with yet another exemplary embodiment of the present disclosure.
Figure 14:
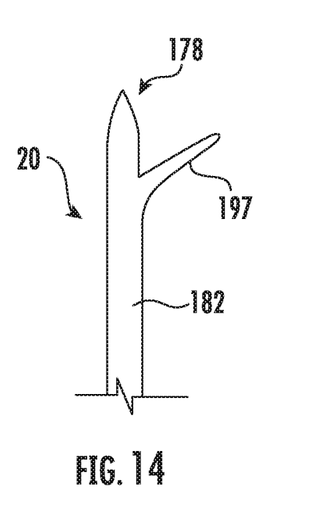
FIG. 14 is a close-up, forward-looking-aft view of a winglet of a first outlet guide vane of a plurality of outlet guide vanes in accordance with still another exemplary embodiment of the present disclosure.
Figure 15:
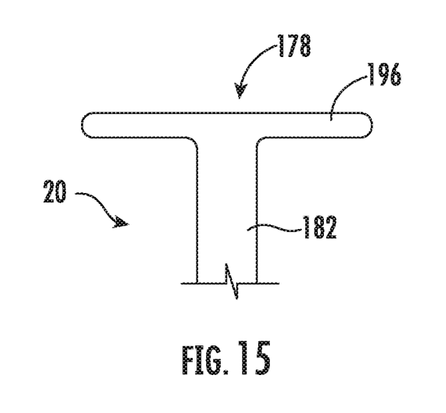
FIG. 15 is a close-up, forward-looking-aft view of a winglet of a first outlet guide vane of a plurality of outlet guide vanes in accordance with yet another exemplary embodiment of the present disclosure.

It will be appreciated, however, that in other exemplary embodiments, the outlet guide vanes 20 may have any other suitable configuration for increasing an efficiency at its tip 178. For example, referring now to FIGS. 12 through 15, four additional embodiments are depicted. FIG. 12 depicts a gradual winglet 192 configured similar to the winglet 180 described above, but with a bend having larger radius of curvature and greater bend angle. In such a manner, it will be appreciated that the winglet 192 may define a radius of curvature approaching the tip chord, or greater than the tip chord. FIG. 13 depicts a split winglet 194 extending from a pressure side and a suction side of the outlet guide vane 20 at the tip 178. Additionally, FIG. 14 depicts a "T-shaped" winglet 196 similarly extending from a pressure side and a suction side of the outlet guide vane 20 at the tip 178, but with each branch configured similarly to the exemplary winglet 180 described above. Further, FIG. 15 depicts an outlet guide vane 20 with a winglet 197 that splits off from a body 182 of the vane 20 mid-span, such as between about 40% span and about 90% span, such as between about 60% span and about 90% span. The winglet 197 defines an angle with the span of the vane 20 of between about 15 degrees and about 60 degrees, such as between about 25 degrees and about 45 degrees.

Further aspects of the invention are provided by the subject matter of the following clauses:

A single unducted rotor engine defining an axial direction and a radial direction, the engine comprising: a power source; a casing surrounding the power source; an unducted rotor assembly driven by the power source comprising a single row of rotor blades; and an outlet guide vane assembly comprising a plurality of pairs of outlet guide vanes, each pair of the plurality of pairs of outlet guide vanes including first outlet guide vane extending from the casing at a location downstream from the single row of rotor blades of the unducted rotor assembly and a second outlet guide vane also positioned downstream from the single row of rotor blades of the unducted rotor assembly; wherein the first outlet guide vane of each pair of outlet guide vanes defines a first geometry, wherein the second outlet guide vane of each pair of outlet guide vanes defines a second geometry, and wherein the first geometry is not equal to the second geometry.

The single unducted rotor engine of one or more of these clauses, wherein the power source is a turbomachine.

The single unducted rotor engine of one or more of these clauses, wherein the first outlet guide vane and second outlet guide vane are each respectively defined by at least a chord, camber, thickness, span, and, optionally, a winglet; wherein at least one of the chord, camber, thickness, span, and, optionally, winglet for the first outlet guide vane is greater than or less than that of the second outlet guide vane, respectively The single unducted rotor engine of one or more of these clauses, wherein the first outlet guide vane defines a first span, wherein the second outlet guide vane defines a second span, and wherein the first span is greater than the second span.

The single unducted rotor engine of one or more of these clauses, wherein the second span is greater than about 5% of the first span and less than about 75% of the second span.

The single unducted rotor engine of one or more of these clauses, wherein the second span is greater than about 10% of the first span and less than about 55% of the second span.

The single unducted rotor engine of one or more of these clauses, wherein the first outlet guide vane extends outwardly from the casing along the radial direction.

The single unducted rotor engine of one or more of these clauses, wherein the outlet guide vane assembly comprises a duct at least partially surrounding the first outlet guide vane, and wherein the second outlet guide vane extends inward from the duct along the radial direction.

The single unducted rotor engine of one or more of these clauses, wherein the first outlet guide vane defines a first chord, wherein the second outlet guide vane defines a second chord, and wherein the first chord is greater than the second chord.

The single unducted rotor engine of one or more of these clauses, wherein the first outlet guide vane defines a leading edge, wherein the second outlet guide vane defines a leading edge, and wherein the leading edge of the first outlet guide vane is offset from the leading edge of the second outlet guide vane along a centerline axis of the engine.

The single unducted rotor engine of one or more of these clauses, wherein the outlet guide vane assembly includes a bridge extending between the first outlet guide vane and the second outlet guide vane.

The single unducted rotor engine of one or more of these clauses, wherein the first outlet guide vane defines a leading edge, wherein the second outlet guide vane defines a leading edge, and wherein the leading edge of the first outlet guide vane is aligned with the leading edge of the second outlet guide vane along a circumferential direction of the engine.

The single unducted rotor engine of one or more of these clauses, wherein the first and second outlet guide vanes are each variable pitch outlet guide vanes.

The single unducted rotor engine of one or more of these clauses, wherein the first and second outlet guide vanes are configured to vary their respective pitches in unison.

The single unducted rotor engine of one or more of these clauses, wherein the first and second outlet guide vanes are configured to vary their respective pitches relative to one another.

The single unducted rotor engine of one or more of these clauses, wherein the first plurality of outlet guide vanes includes a first outlet guide vane, wherein the second plurality of outlet guide vanes includes a second outlet guide vane, wherein the engine further comprises a pitch change plate configured to rotate about an axis extending substantially perpendicular to a centerline axis of the engine, and wherein the first outlet guide vane and the second outlet guide vane are both mounted to the pitch change plate.

The single unducted rotor engine of one or more of these clauses, wherein the first outlet guide vane is part of a first plurality of outlet guide vanes each having the first geometry, wherein the second outlet guide vane is part of a second plurality of outlet guide vanes each having the second geometry, and wherein the first and second pluralities of outlet guide vanes are alternatingly spaced along a circumferential direction of the unducted rotor engine.

The single unducted rotor engine of one or more of these clauses, wherein the plurality of pairs of outlet guide vanes are sequentially spaced along the circumferential direction.

A gas turbine engine defining an axial direction and a radial direction, the engine comprising: a turbomachine; a casing surrounding the turbomachine; a rotor assembly driven by the turbomachine comprising a row of rotor blades; and an outlet guide vane assembly comprising a plurality of pairs of outlet guide vanes, each pair of the plurality of pairs of outlet guide vanes including first outlet guide vane extending from the casing at a location downstream from the single row of rotor blades of the rotor assembly and a second outlet guide vane also positioned downstream from the row of rotor blades of the rotor assembly; wherein the first outlet guide vane of each pair of outlet guide vanes defines a first geometry, wherein the second outlet guide vane of each pair of outlet guide vanes defines the second geometry, and wherein the first geometry is not equal to the second geometry The gas turbine engine of one or more of these clauses, wherein the first outlet guide vane defines a first span, wherein the second outlet guide vane defines a second span, and wherein the first span is greater than the second span.

The gas turbine engine of one or more of these clauses, wherein the second span is greater than about 5% of the first span and less than about 75% of the second span.

The gas turbine engine of one or more of these clauses, wherein the first outlet guide vane defines a first chord, wherein the second outlet guide vane defines a second chord, and wherein the first chord is greater than the second chord.

The gas turbine engine of one or more of these clauses, wherein the first outlet guide vane defines a leading edge, wherein the second outlet guide vane defines a leading edge, and wherein the leading edge of the first outlet guide vane is offset from the leading edge of the second outlet guide vane along a centerline axis of the engine.

A single unducted rotor engine defining an axial direction and a radial direction, the engine comprising: a turbomachine; a casing surrounding the turbomachine; an unducted rotor assembly driven by the turbomachine comprising a single row of a plurality of rotor blades; and an outlet guide vane assembly comprising a plurality of outlet guide vanes, the plurality of outlet guide vanes including a first outlet guide vane having a body extending between a root and a tip along the radial direction and a winglet extending from the body at the tip.

The single unducted rotor engine of one or more of these clauses, wherein the winglet of the outlet guide vane extends in a direction substantially 90° from the body of the outlet guide vane.

The single unducted rotor engine of one or more of these clauses, wherein the winglet defines a width along a circumferential direction, wherein the body of the outlet guide vane defines a tip chord length at the tip, and wherein the width of the winglet is less than about 10% of the tip chord length in at least about 1% of the tip chord length.

The single unducted rotor engine of one or more of these clauses, wherein the body of the outlet guide vane defines a tip chord length at the tip, and wherein the winglet extends substantially along an entirety of the tip chord length.

The single unducted rotor engine of one or more of these clauses, wherein the body of the outlet guide vane defines a tip chord length of the tip, and wherein the winglet extends less than an entirety of the tip chord length.

The single unducted rotor engine of one or more of these clauses, wherein the winglet is a split winglet extending from a pressure side and a suction side of the outlet guide vane.

The single unducted rotor engine of one or more of these clauses, wherein the winglet is a T-shaped winglet extending from a pressure side and a suction side of the outlet guide vane.

A rotor engine defining an axial direction and a radial direction, the engine comprising: a power source; a casing surrounding the power source; a rotor assembly driven by the power source and comprising a row of rotor blades; and an outlet guide vane assembly comprising a first outlet guide vane extending from the casing at a location downstream from the row of rotor blades and a second outlet guide vane also positioned downstream from the row of rotor blades, wherein the first outlet guide vane is configured to change pitch relative to the second outlet guide vane.

The rotor engine of one or more of these clauses wherein the first outlet guide vane is a variable pitch outlet guide vane and the second outlet guide vane is a fixed pitch outlet guide vane.

The rotor engine of one or more of these clauses wherein the second outlet guide vane is mounted to or incorporated into a structure of the engine or a structure proximate to the engine (such as a pylon, a wing, a fuselage, a stabilizer, etc.).

The single unducted rotor engine of one or more of these clauses including one or more features from one or more of the clauses related to a gas turbine engine.

The gas turbine engine of one or more of these clauses including one or more features from one or more of the clauses related to a single unducted rotor engine.

What is claimed is:

1. A single unducted rotor engine defining an axial direction, and a radial direction, and a circumferential direction, the engine comprising:
    a power source;
    a casing surrounding the power source;
    an unducted rotor assembly driven by the power source comprising a single row of rotor blades; and
    an outlet guide vane assembly comprising a plurality of pairs of outlet guide vanes,
    wherein each pair of the plurality of pairs of outlet guide vanes includes a first outlet guide vane extending from the casing at a location downstream from the single row of rotor blades of the unducted rotor assembly and a second outlet guide vane also positioned downstream from the single row of rotor blades of the unducted rotor assembly,
    wherein the first outlet guide vane of each pair of outlet guide vanes defines a first geometry span,
    wherein the second outlet guide vane of each pair of outlet guide vanes defines a second span,
    wherein the first span is not equal to the second span,
    wherein the first and second outlet guide vanes of each pair of outlet guide vanes are each variable pitch outlet guide vanes,
    wherein the engine further comprises, for each pair of outlet guide vanes, a pitch change plate configured to rotate about an axis extending substantially perpendicular to a centerline axis of the engine on which the first outlet guide vane and the second outlet guide vane are mounted such that, for a predetermined pitch position of the pitch change plate, leading edges of the first outlet guide vane and the second outlet guide vane are substantially aligned along the circumferential direction.

2. The single unducted rotor engine of claim 1,
wherein, for each pair of outlet guide vanes, the first outlet guide vane and second outlet guide vane are each respectively defined by at least a chord, camber, and thickness,
wherein, for each pair of outlet guide vanes, at least one of the chord, the camber, and the thickness, for the first outlet guide vane of each pair of outlet guide vanes is greater than or less than that of the second outlet guide vane of each pair of outlet guide vanes.

3. The single unducted rotor engine of claim 1,
wherein, for each pair of outlet guide vanes, the first span is greater than the second span.

4. The single unducted rotor engine of claim 3, wherein the second span is greater than about 5% of the first span and less than about 75% of the second span.

5. The single unducted rotor engine of claim 3, wherein the second span is greater than about 10% of the first span and less than about 55% of the second span.

6. The single unducted rotor engine of claim 1, wherein the first outlet guide vane of each pair of outlet guide vanes extends outwardly from the casing along the radial direction.

7. The single unducted rotor engine of claim 1,
wherein, for each pair of outlet guide vanes, the first outlet guide vane defines a first chord and the second outlet guide vane defines a second chord, and
wherein the first chord is greater than the second chord.

8. The single unducted rotor engine of claim 7,
wherein, for each pair of outlet guide vanes, the first outlet guide vane defines a leading edge and the second outlet guide vane defines a leading edge, and
wherein, for each pair of outlet guide vanes, the leading edge of the first outlet guide vane is offset from the leading edge of the second outlet guide vane along a centerline axis of the engine.

9. The single unducted rotor engine of claim 7, wherein the outlet guide vane assembly includes, for each pair of outlet guide vanes, a bridge extending between the first outlet guide vane and the second outlet guide vane.

10. The single unducted rotor engine of claim 1,
wherein, for each pair of outlet guide vanes, the pitch change plate is configured to rotate about a pitch axis of the first outlet guide vane.

11. The single unducted rotor engine of claim 1,
wherein the first outlet guide vane of each pair of outlet guide vanes is part of a first plurality of outlet guide vanes each having the first span,
wherein the second outlet guide vane of each pair of outlet guide vanes is part of a second plurality of outlet guide vanes each having the second span, and
wherein the first and second pluralities of outlet guide vanes are alternatingly spaced along a circumferential direction of the unducted rotor engine.

12. The single unducted rotor engine of claim 1, wherein the plurality of pairs of outlet guide vanes are sequentially spaced along the circumferential direction.

* * * * *